United States Patent
Bispinghoff et al.

(10) Patent No.: US 12,521,317 B2
(45) Date of Patent: Jan. 13, 2026

(54) HIGHLY FLOWABLE PREPOLYMER COMPOSITION OF HIGH RADIOPACITY ALLOWING FOR HIGH DEPTH PHOTOPOLYMERIZATION

(71) Applicant: Odne AG, Dübendorf (CH)

(72) Inventors: Mark Bispinghoff, Zurich (CH); Andreas Schmocker, Lausanne (CH); Aaron Johnson, Winterthur (CH)

(73) Assignee: Odne AG, Dübendorf (CH)

( * ) Notice: Subject to any disclaimer, the term of this patent is extended or adjusted under 35 U.S.C. 154(b) by 425 days.

(21) Appl. No.: 17/922,510

(22) PCT Filed: May 11, 2021

(86) PCT No.: PCT/EP2021/062553
§ 371 (c)(1),
(2) Date: Oct. 31, 2022

(87) PCT Pub. No.: WO2022/017658
PCT Pub. Date: Jan. 27, 2022

(65) Prior Publication Data
US 2023/0172813 A1    Jun. 8, 2023

(30) Foreign Application Priority Data
Jul. 20, 2020   (EP) .................................. 20186714

(51) Int. Cl.
| | |
|---|---|
| *A61K 6/17* | (2020.01) |
| *A61K 6/54* | (2020.01) |
| *A61K 6/62* | (2020.01) |
| *A61K 6/71* | (2020.01) |
| *A61K 6/887* | (2020.01) |

(52) U.S. Cl.
CPC .................. *A61K 6/17* (2020.01); *A61K 6/54* (2020.01); *A61K 6/62* (2020.01); *A61K 6/71* (2020.01); *A61K 6/887* (2020.01)

(58) Field of Classification Search
None
See application file for complete search history.

(56) References Cited

U.S. PATENT DOCUMENTS

| | | | |
|---|---|---|---|
| 2010/0041789 A1* | 2/2010 | Neffgen | B82Y 5/00 523/117 |
| 2014/0138864 A1* | 5/2014 | Plaumann | A61K 6/887 523/116 |
| 2022/0009790 A1 | 1/2022 | Mathym | |

FOREIGN PATENT DOCUMENTS

| | | |
|---|---|---|
| EP | 1 734 088 A1 | 12/2006 |
| WO | WO 2017/149242 A1 | 9/2017 |
| WO | WO 2018/011680 A1 | 1/2018 |
| WO | WO 2018/087495 A1 | 5/2018 |
| WO | WO 2020/109477 A1 | 6/2020 |

* cited by examiner

*Primary Examiner* — Peter A Salamon
(74) *Attorney, Agent, or Firm* — Muncy, Geissler, Olds & Lowe, P.C.

(57) ABSTRACT

The invention relates to a highly flowable crosslinkable medical or dental composition comprising a crosslinkable compound, a polymerization initiator and a heterogeneous radiopacifier. Also described is a crosslinked polymer composition obtainable by crosslinking said highly flowable, crosslinkable medical or dental composition and the use of said highly flowable crosslinkable medical or dental composition to fill cavities or hollow structures in human or animal subjects.

14 Claims, No Drawings

HIGHLY FLOWABLE PREPOLYMER COMPOSITION OF HIGH RADIOPACITY ALLOWING FOR HIGH DEPTH PHOTOPOLYMERIZATION

CROSS REFERENCE TO RELATED APPLICATIONS

This application is a National Stage of International Application No. PCT/EP2021/062553, filed on May 11, 2021, for which priority is claimed under 35 U.S.C. § 371; and this application claims priority of application No. 20186714.0 filed in Europe on Jul. 20, 2020 under 35 U.S.C. § 119, the entire contents of both of which are hereby incorporated by reference.

FIELD OF THE INVENTION

The invention relates to a highly flowable crosslinkable medical or dental composition comprising a crosslinkable compound, a polymerization initiator and a heterogeneous radiopacifier. Also described is a crosslinked polymer composition obtainable by crosslinking said highly flowable, crosslinkable medical or dental composition and the use of said highly flowable crosslinkable medical or dental composition to fill cavities or hollow structures in human or animal subjects.

BACKGROUND OF THE INVENTION

Many biomedical applications rely on the use of fillers or implant materials to achieve their goal, whether to fill a cavity or support surrounding tissue. For visualization of these materials after implantation, a degree of radiopacity is required so they can be distinguished from the surrounding tissue by X-ray or CT scans. The required level of radiopacity of the material is determined by the surrounding tissue. Meaning that if a tissue has a naturally high level of radiopacity the implanted material must exhibit a higher degree of radiopacity to achieve a good level of resolution when being visualized.

For some medical filler materials, especially high radiopacity is required due to the high X-ray absorbance of the surrounding tissue (e.g. bone, dentine, and enamel). Usually, the radiopacity of materials is increased by the addition of heavy-metal-containing salts or oxides, for example, BaSO4, ZrO2, YbF3, CaWO4, Ti, $TiO_2$, $SrCO_3$, $Bi_2O_3$, $BiF_3$ or other bismuth compounds.[1-5] The use of radiopacifiers has its drawbacks, for example, due to the high opacity, light penetration through these materials is greatly inhibited. Also due to the high density of radiopaque particles, they tend to segregate from the media in which they are dispersed.

To achieve the level of radiopacity required, for instance in dental or endodontic filler applications (>3 mmAl/mm), sufficiently high concentrations of such inorganic fillers are needed. Addition of macro- or micro-powders of such inorganic fillers to a highly flowable, aqueous prepolymer solution leads to a significant decrease in flowability, thus inhibiting injection through small cannulas and/or effective filling of tubular, hollow structures, voids, or cavities. Furthermore, the addition of these inorganic powders to a highly flowable formulation results in an unstable dispersion, in which the filler particles can segregate during injection, solidification or storage, thus nullifying the injectability and homogeneity of the formulation. In addition, inorganic particles also strongly absorb and scatter light, impeding light penetration into deeper layers of uncured material, and thus, if used in conjunction with a photopolymerizable formulation leads to low curing depth.

This is unfortunate since the use of photopolymerization bears many advantages over other polymerization approaches. Thermal and pressure initiated polymerization methods are limited within biomedical applications due to the potential harm caused to surrounding tissue, whereas photopolymerization can be achieved using UV or visible light. Another alternative, two-component redox methods, require mixing just prior to application making their use more tedious and complicated. They also introduce a time constraint, thus adding more room for error to procedures. Photopolymerization, on the other hand, can be selectively initiated when the uncured material has been correctly and sufficiently applied.

WO 2018/011680 (ECOLE POLYTECHNIQUE FED DE LAUSANNE (EPFL) [CH]) has presented low-viscosity crosslinkable material adapted to be delivered into small (in the range of 10-1000 μM in diameter) branched tubular structures. The compositions, which included heavy-metal containing radiopaque particles (1-800 μm), obtained high levels of radiopacity (up to 68 mmAl/mm). Drawbacks included limited dispersion stability leading to segregation and agglomeration of the particles, thus impeding homogeneity and injectability of the composition, as well as hindered photopolymerization depth due to light absorption and scattering caused by the particles. These problems were overcome with the substitution of the particles with water-soluble iodine-containing compounds; however, when these iodine-based compounds were employed within a polymeric network, they diffused out. Thus, not allowing for visualization of the polymerized material after leaching of the radiopaque agent. Examples of commercially available iodine-based contrast agents are Iopamiro, Iopamiron, Iopamidol, Cystografin, DaTscan, Isovue, and Diatrizoate.

The radiopaque inorganic filler must remain retained within the polymer after curing to ensure that the material can always be visualized be X-ray while still implanted.

WO 2017/149242 (MATHYM [FR]) and WO 2018/087495 (MATHYM [FR]) present the development and preparation of heavy-element-containing fluoride-based nanoparticles, with diameters <100 nm, that form stable suspensions. WO 2020/109477 (MATHYM [FR]) presents a method for the preparation of zirconium dioxide nanoparticles that are also stable suspensions.

EP 1 734 088 A1 (CANON KK [JP]) has presented an aqueous ink composition that employs a water-soluble, non-ionic photoinitiator containing a poly(ethylene glycol) moiety, (poly(ethylene glycol) (2,4,6-trimethylbenzoyl) phenylphosphinate). This photoinitiator is capable of high initiation efficiency in aqueous media.

A photocurable composition with high radiopacity that still allows for high flowability and deep light penetration is required. In summary, it must fulfill the following properties:

A highly flowable liquid composition that remains a stable suspension upon storage;

The inorganic, radiopaque filler must not interfere with photopolymerization yield or depth of cure including the level of light penetration by absorption, light-scattering, or by any other means.

BRIEF DESCRIPTION OF THE INVENTION

The invention concerns a highly flowable, crosslinkable medical or dental composition, said highly flowable composition comprising a crosslinkable compound, a polymerization initiator and a solid heterogeneous radiopacifier wherein:
  i. it has a radiopacity of at least 3 mmAl/mm according to ISO 13116-2014,
  ii. it remains a stable dispersion for 30 days,
  iii. it has a flowability of >40 mm according to ISO 6876-2012, and
  iv. the heterogeneous radiopacifier has an average particle size between 1 and 500 nm.

Compositions of crosslinkable compounds including heavy-metal-containing insoluble nanoparticles displaying high levels of radiopacity (>3 mmAl/mm) were capable of maintaining stable suspensions that do not segregate or agglomerate upon storage. Furthermore, the compositions exhibited high enough flowabilities to be capable of injection through thin cannulas as small as 31 G with an inner diameter of 0.13 mm and an outer diameter of 0.26 mm. Impressively, with such nanoparticles, the compositions are highly transparent due to the reduced light absorption and scattering, leading to high light penetration and thus, high depths of cure.

The radiopaque materials used are water-insoluble, highly radiopaque nanoparticles with diameters 1-500 nm. They can be comprised of, but not limited to: salts such as barium sulfate, ytterbium halides, bismuth halides, calcium tungstate; metal oxides such as ytterbium oxide, zirconium oxide, tantalum oxide, cerium dioxide, yttrium oxide, gadolinium oxide, aluminum oxide; heavy-metal containing silicate glasses; and combinations thereof.

A further object of the invention is to provide a cross-linked polymer composition obtainable by crosslinking the highly flowable, crosslinkable medical or dental composition of the invention, wherein its radiopacity of at least 3 mmAl/mm remains unchanged when it is immersed in aqueous media for at least 24 days.

Yet another object of the invention is to provide a process for preparing a highly flowable, crosslinkable medical or dental composition that can be cured to high depth.

Once polymerized, the material is able to maintain its radiopacity indefinitely. No leaching of the radiopaque material is observed when the crosslinked material is fully immersed in water.

Another object of the invention is the use of said highly flowable, crosslinkable medical or dental composition, to fill cavities or hollow structures within teeth, dental root canals or dental fissures, blood vessels, lymphatic vessels, bronchi and bronchioles, or bone cavities in human or animal subjects.

Other objects and advantages of the invention will become apparent to those skilled in the art from a review of the ensuing detailed description, which proceeds with reference to the attendant claims.

DETAILED DESCRIPTION OF THE INVENTION

Although methods and materials similar or equivalent to those described herein can be used in the practice or testing of the present invention, suitable methods and materials are described below. All publications, patent applications, patents, and other references mentioned herein are incorporated by reference in their entirety. The publications and applications discussed herein are provided solely for their disclosure prior to the filing date of the present application. Nothing herein is to be construed as an admission that the present invention is not entitled to antedate such publication by virtue of prior invention. In addition, the materials, methods, and examples are illustrative only and are not intended to be limiting.

In the case of conflict, the present specification, including definitions, will control.

Unless defined otherwise, all technical and scientific terms used herein have the same meaning as is commonly understood by one of skill in the art to which the subject matter herein belongs.

As used herein, the following definitions are supplied in order to facilitate the understanding of the present invention.

As used in the specification and claims, the singular forms "a", "an" and "the" include plural references unless the context clearly dictates otherwise.

The presence of broadening words and phrases such as "one or more," "at least," "but not limited to" or other like phrases in some instances shall not be read to mean that the narrower case is intended or required in instances where such broadening phrases may be absent.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "substantially" with reference to a property or characteristic means that the property or characteristic is exhibited to a greater extent than the opposite of that property or characteristic is exhibited.

Also, the use of "or" means "and/or" unless otherwise stated.

Similarly, "comprise", "comprises", "comprising", "include", "includes" and "including" are interchangeable and not intended to be limiting. The term "comprise" is generally used in the sense of include, that is to say permitting the presence of one or more features or components.

It is to be further understood that where descriptions of various embodiments use the term "comprising", those skilled in the art would understand that in some specific instances, an embodiment can be alternatively described using language "consisting essentially of" or "consisting of".

Also, herein the recitations of numerical ranges by endpoints include all numbers subsumed within that range (e.g., 1 to 5 includes 1, 1.5, 2, 2.75, 3, 3.80, 4, 5, etc.).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In the frame of the present disclosure, the term "composition" is used interchangeably with the term "formulation". A "composition", as used herein, refers to a mixture of ingredients or compounds prepared in a certain way and used for a specific purpose. The concept is also clearly linked to the process in which different compounds are combined to produce a final product.

The term "pre-polymer" or "prepolymer" refers to a monomer or system of monomers that has been reacted to an intermediate molecular mass state. This material is capable of further polymerization by reactive groups to a fully cured high molecular weight, cross-linked state. As such, mixtures of reactive polymers with un-reacted monomers may also be referred to as pre-polymers. The term "prepolymer" and "polymer precursor" may be interchanged. A prepolymer is a stable usually partially polymerized chemical intermediate that can be fully polymerized at a later time.

The term "curing" means the hardening or partial hardening of a composition by any mechanism, e.g., by heat, light, radiation, e-beam, microwave, chemical reaction, or combinations thereof.

A "precursor", "precursor composition" or "polymer precursor" refers to the substance before chemical reaction (polymerization). The term "prepolymer", "polymer precursor" or "polymer intermediate" may be interchanged.

Where two or more moieties are described as being "each independently" selected from a list of atoms or groups, this means that the moieties may be the same or different. The identity of each moiety is therefore independent of the identities of the one or more other moieties.

In polymer science, the "backbone" chain of a polymer is the longest series of covalently bonded atoms that together create the continuous chain of the molecule. This science is subdivided into the study of organic polymers, which consist of a carbon backbone, and inorganic polymers which have backbones containing only main group elements.

"Endgroups" are an important aspect of polymer synthesis and characterization. In polymer chemistry, endgroups are functionalities or constitutional units that are at the extremity of a macromolecule or oligomer (IUPAC). In polymer synthesis, like condensation polymerization and free-radical types of polymerization, end-groups are commonly used and can be analyzed for example by nuclear magnetic resonance (NMR) to determine the average length of the polymer. Other methods for characterization of polymers where endgroups are used are mass spectrometry and vibrational spectrometry, like infrared and Raman spectrometry. Not only are these groups important for the analysis of the polymer, but they are also useful for grafting to and from a polymer chain to create a new copolymer. Finally, they can also be used to crosslink polymers.

"(meth)acrylate" is a shorthand reference to acrylate, methacrylate, or combinations thereof; "(meth)acrylic" is a shorthand reference to acrylic, methacrylic, or combinations thereof; and "(meth)acryl" is a shorthand reference to acryl, methacryl, or combinations thereof.

Herein the term "highly flowable" or "high flowability" refers to a result of the flow test according to ISO 6876-2012 of >40 mm. High flowability is due to low viscosity. ISO 6876-2012 (as defined in "Dentistry—Root Canal Sealing Materials" (ISO 6876-2012)) specifies requirements and test methods for root canal (endodontic) sealing materials which set with or without the assistance of moisture and are used for permanent obturation of the root canal with or without the aid of obturating points/cones. It only covers sealers intended for orthograde use, i.e. a root filling placed from the coronal aspect of a tooth.

Flow measurements were carried out in accordance with ISO 6876-2012. 50 µL of a given formulation was placed between two glass slides (40 mm×40 mm×5 mm; 20 g). A weight (100 g) was placed on top of the slides. After ten minutes, the minimum and maximum diameter of the spread formulation was measured.

"Homogeneous" or "homogeneity" refers to a solid or liquid mixture that has the same proportions of its components anywhere in a given sample.

"Radiopacity" or "Radiodensity" is the opacity of a material to the radio wave and X-ray portion of the electromagnetic spectrum measured in accordance with ISO 13116-2014 (as defined in "Dentistry—Test Method for Determining Radio-Opacity of Materials" (ISO 13116-2014)). Meaning the inability for electromagnetic radiation to pass through a given material.

"Radiopacifier" refers to a radiopaque material that is added to a composition to increase its radiopacity.

"High radiopacity" is regarded as a material that has a radiopacity of at least 3 mmAl/mm.

"Heterogeneous" or "heterogeneity" refers to a component of a mixture being in a different state of matter (e.g. gas, liquid, or solid) compared to that of the remaining components within a formulation.

"Total Attenuation" refers to the sum of both the absorption and scattering of light or other forms of electromagnetic radiation.

The term "cured" refers to a material or composition that has been solidified or partially solidified (e.g., (co)polymerized or crosslinked) by a chemical reaction.

"Depth of cure" refers to the depth a volume of material can be photopolymerized by exposing it to light from the top. The depth of cure depends on the activity of the photoinitiation system and the ability of light to penetrate into the depth of a material. Accordingly, a highly transparent material with a low absorption of light at the wavelength used for the photoinitiation, results in a high depth of cure. The absorption or total attenuation can be measured with a UV-Vis spectrometer through a 1 cm cuvette.

"Curved structure" refers to a mould that has a conical or cylindrical structure with a bend at a given depth.

In polymer chemistry "cross-linking" usually refers to the use of cross-links to promote a change in the polymers' physical properties. The term cross-link is a bond that links one polymer chain to another. These links may take the form of covalent bonds (chemical cross-links) or by hydrogen bonds, hydrophobic interactions or chain entanglements (physical cross-links). The polymers can be either synthetic polymers or natural polymers. Crosslinking is the general term for the process of forming bonds or relatively short sequences of chemical bonds to join two polymer chains together. In polymer chemistry, when a synthetic polymer is said to be "cross-linked", it usually means that the entire bulk of the polymer has been exposed to the cross-linking method. The resulting modification of mechanical properties depends strongly on the cross-link density. Low cross-link densities decrease the flowability of polymer melts. Intermediate cross-link densities transform gummy polymers into materials that have elastomeric properties and potentially high strengths. Very high cross-link densities can cause materials to become very rigid or glassy, such as phenol-formaldehyde materials. Cross-links can be formed by chemical reactions that can be initiated by heat, pressure, change in pH, or irradiation. For example, mixing of an unpolymerized or partially polymerized material with specific chemicals called crosslinking reagents results in a chemical reaction that forms cross-links. Cross-linking can also be induced in materials that are normally thermoplastic through exposure to a radiation source, such as electron beam, gamma radiation, or UV light.

The term "crosslinkable" refers to a material also herein defined as prepolymer that is capable of being "crosslinked".

"Polymerization initiator" refers to a compound that starts the crosslinking of monomeric units.

One object of the invention is to provide a highly flowable, crosslinkable medical or dental composition in the form of a dispersion, said highly flowable composition comprising a crosslinkable compound, a polymerization initiator and a heterogeneous radiopacifier wherein:
  i. it has a radiopacity of at least 3 mmAl/mm according to ISO 13116-2014,
  ii. it remains a stable dispersion for 30 days,
  iii. it has a flowability >40 mm according to ISO 6876-2012, and
  iv. the heterogeneous radiopacifier has an average particle size between 1 and 500 nm.

High flowability is a result of low viscosity. In a preferred embodiment, the composition has a viscosity between $2 \times 10^4$-$1 \times 10^3$ Pa·s, which makes it highly flowable. Viscosity is measured by rheology at room temperature (22° C.) with a shear rate between 1 and 300 s-1. The ratio between the shear stress and shear rate corresponds to the viscosity and remains constant with changing shear rate in case of Newtonian behaviour.

Compositions of crosslinkable compounds and heavy-metal-containing insoluble nanoparticles displaying high levels of radiopacity (>3 mmAl/mm) were capable of maintaining stable suspensions upon storage. Furthermore, the compositions exhibited high enough flowability to be capable of injection through small cannulas (30 G with an inner diameter of 0.16 mm and an outer diameter of 0.31 mm). Impressively, with such nanoparticles, the compositions are highly transparent due to the reduced light absorption and scattering (see Example 10), leading to high light penetration and thus, high depths of cure (>40 mm) using a laser ($\lambda$=405 nm, p=4 mW) for 20 seconds.

The radiopaque materials used are water-insoluble, highly radiopaque (>3 mmAl/mm) nanoparticles with diameters 1-1000 nm. In a preferred embodiment, the nanoparticles have diameters of 1-100 nm. In an even more preferred embodiment, the nanoparticles have diameters of 1-20 nm. In the most preferred embodiment, the nanoparticles have diameters of 1-5 nm.

According to an embodiment of the invention, the highly flowable, crosslinkable medical or dental composition photopolymerizes to a depth of cure of at least 1 mm. More preferably, it photopolymerizes to a depth of cure of at least 10 mm. Most preferably, it photopolymerizes to a depth of cure of at least 20 mm.

According to another embodiment, the heterogeneous radiopacifier is in the form of a powder or suspension and is selected from the group consisting of non-water-soluble metals or metal oxides, metal salts, or metal complexes. Preferably, said heterogeneous radiopacifier is selected from the group comprising or consisting of metal salts such as barium sulfate, ytterbium halides, bismuth halides, calcium tungstate or metal oxides such as ytterbium oxide, zirconium oxide, tantalum oxide, cerium dioxide, yttrium oxide, gadolinium oxide, aluminium oxide; heavy-metal containing silicate glasses; and/or combinations thereof.

In accordance with a preferred embodiment, the highly flowable, crosslinkable medical or dental composition of the invention further comprises a suitable solvent, wherein said suitable solvent comprises or consists of water, acetone, DMSO or alcohols or mixtures thereof.

The term "suitable solvent" refers to a non-reactive solvent which is a solvent that does not (co)polymerize into the highly flowable, crosslinkable medical or dental composition, also referred herein as the curable composition, in which the components of the composition can be dissolved homogenously at the required concentration and do not inhibit the polymerization reaction.

According to a preferred embodiment, the suitable solvent essentially consists of water (deionized or containing ions or buffers), acetone, DMSO, alcohols, or mixtures thereof. In another embodiment of the invention, the suitable solvent can contain other reagents or compounds. In yet another embodiment, these reagents or compounds are NaOCl, EDTA, HEDP, Chlorhexidine, NaOH, $Ca(OH)_2$ or other reagents that are commonly used in the cleaning, disinfection, or irrigation of dental root canals.

In particular, the highly flowable, crosslinkable medical or dental composition of the invention also referred as the photocurable, high-radiopacity prepolymer composition contains 5-90% in weight of the crosslinkable compound, 5-90% in weight of the heterogeneous radiopacifier, 5-90% in weight of the suitable solvent, and 0.001-10% in weight of the polymerization initiator. Preferably, the highly flowable composition of the invention contains 20-70% in weight of the crosslinkable material, 20-60% in weight of the heterogeneous radiopacifier, 5-60% in weight of the suitable solvent, and 0.001-2% in weight of the polymerization initiator.

Embodiments of the highly flowable, crosslinkable medical or dental composition of the invention preferably contain about 36-90% in weight of the heterogeneous radiopacifier, in particular 36-60% in weight of the heterogeneous radiopacifier, or in particular 36-40% in weight of the heterogeneous radiopacifier, etc. Such content of the heterogeneous radiopacifier advantageously enables to reach the desired levels of high radiopacity.

The heterogeneous radiopacifier can preferably have an average particle size between 5 and 20 nm measured by transmission electron microscopy.

Embodiments of the composition of the invention can preferably contain about 20-90% in weight of the suitable solvent, in particular 30-60% in weight of the suitable solvent, or in particular 30% in weight of the suitable solvent.

According to an embodiment of the invention, the polymerization initiator is a UV or visible light photoinitiator. A sub-stoichiometric amounts of photoinitiator are required to commence the polymerization reaction. This is activated by UV or visible light photoinitiator and is selected from the groups comprising, but not limited to quinones, α-hydroxy ketones, acylgermanium derivatives, bis(acyl)phosphine oxide derivatives, mono(acyl)phosphine oxide derivatives, or mixtures thereof.

According to a further embodiment of the invention, the crosslinkable compound is water-soluble. Preferably said water-soluble crosslinkable compound comprises or consists of a polymer functionalised with polymerizable endgroups.

In particular, the crosslinkable compound contains end-groups that have the ability to polymerize when initiated by a polymerization initiator via chemical, heat, or light energy.

According to a preferred embodiment the crosslinkable compound contains end-groups that have the ability to polymerize when initiated by a polymerization initiator; and is also water-soluble. In a more preferred embodiment of the invention, the water-soluble crosslinkable prepolymer has the formula I:

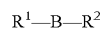

(I)

where:
B is a backbone selected from the group consisting of:
Poly(ethylene glycol) (PEG):

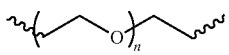

with n comprising between 1 to 450 repeating units,
Oligo(ethylene glycol) (EG):

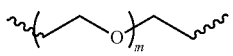

with m comprising between 1 to 12 repeating units,
Poloxamer:

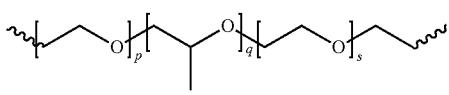

where p, q, and s are independent from each other and comprise between 1 to 200 repeating units,
Inverse Poloxamer:

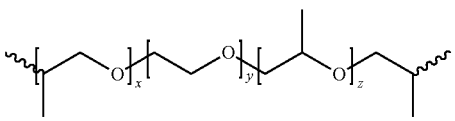

where x, y, and z are independent from each other and comprise between 1 to 200 repeating units;
R1 and R2 are endgroups with R1 being equal or different from R2, where R1 and R2 are selected from the group consisting of: methoxy; acrylate; methacrylate; acrylamide; methacrylamide; vinylsulfone; with the proviso that R2 is not methoxy when R1 is methoxy.

Yet another object of the invention is to provide a process for preparing a highly flowable, crosslinkable, high-radiopacity composition that can be cured to a high depth, said process comprising the steps of:
a) dissolving the crosslinkable compound in a suitable solvent (as defined above);
b) adding a stable suspension of insoluble radiopaque nanoparticles;
c) adding a radical photopolymerization initiator either as a solution in a suitable solvent or as a fine powder.

The homogeneity and flowability of different radiopacifiers in crosslinkable compound formulations or dispersions were examined as shown in Example 10. Radiopacifiers with diameters >1 μm segregated in the formulations over a period of 30 days or less. Whereas formulations with nanoparticulate radiopacifiers remained in suspension throughout the 30-day period between 5 and 37° C. Formulations containing no radiopacifiers or radiopacifiers with diameters 5-20 nm were easily passed through 30 G cannulas and did not segregate in the syringe after 1 hour. Other radiopaque powders tested were difficult or impossible to pass through the cannulas and most segregated within the syringe. When carrying out flow measurements according to ISO 6876-2012, it was observed that formulations containing no radiopacifier or radiopaque nanoparticles spread beyond the limitations of the apparatus (>40 mm).

Furthermore, all of the radiopacifiers with diameters >1 μm segregated in the formulations over a period of 30 days.

Polymerization yields of the radiopaque formulations were assessed in polystyrene cuvettes as per Example 6. Results showed that nano-radiopacifiers did not inhibit polymerization, whereas larger radiopacifier particles that where tested drastically inhibited polymerization or segregated within the formulation of the materials effectively polymerized (see Examples 10 and 11).

When polymerization was carried out in conical moulds to assess polymerization depth in straight and curved structures, radiopaque nanoparticles showed minimal inhibition of curing depth compared to formulations containing no radiopacifiers (see Example 12).

The required amount of radiopacity (>3 mmAl/mm) was assessed by analyzing varying concentrations of nanoparticles within formulations, as shown in Example 13. It was deemed that >36% w/w of nanoparticles was required to reach the desired levels of high radiopacity.

A further object of the invention is to provide a crosslinked polymer composition obtainable by crosslinking the highly flowable, crosslinkable medical or dental composition of the invention, wherein its radiopacity of at least 3 mmAl/mm according to ISO 13116-2014 remains unchanged when it is immersed in aqueous media for at least 24 days.

Once polymerized, the crosslinked polymer composition is able to maintain its radiopacity, during the lifetime of the implanted material, which can be up to 50 years. No loss of radiopacity was observed when the crosslinked polymer composition was fully immersed in water and PBS buffer solution for 24 days, which can be seen in Example 9.

Another object of the invention is the use of the highly flowable, crosslinkable medical or dental composition, to fill cavities or hollow structures within teeth, dental root canals or dental fissures, blood vessel, lymphatic vessels, bronchi and bronchioles, or bone cavities in human or animal subjects.

Advantageously, said highly flowable, crosslinkable medical or dental composition is capable of being injected through small 31 G cannulas with an inner diameter of 0.13 mm and an outer diameter of 0.26 mm, and said highly flowable composition allows photopolymerization to a depth of cure of at least 1 mm in curved tubular structures.

Those skilled in the art will appreciate that the invention described herein is susceptible to variations and modifications other than those specifically described. It is to be understood that the invention includes all such variations and modifications without departing from the spirit or essential characteristics thereof. The invention also includes all of the steps, features, compositions, and compounds referred to or indicated in this specification, individually or collectively, and any and all combinations or any two or more of said steps or features. The present disclosure is, therefore, to be considered as in all aspects illustrated and not restrictive, the scope of the invention being indicated by the appended Claims, and all changes which come within the meaning and range of equivalency are intended to be embraced therein.

Various references are cited throughout this specification, each of which is incorporated herein by reference in its entirety.

The foregoing description will be more fully understood with reference to the following Examples. Such Examples, are, however, exemplary of methods of practicing the present invention and are not intended to limit the scope of the invention.

EXAMPLES

Materials

All synthetic reagents, crosslinking reagents and radiopacifiers where obtained from general chemical laboratory suppliers unless otherwise noted. Heavy-metal containing glass powders were obtained from SCHOTT AG-BU Electronic Packaging, Landshut, Germany. Radiopacifier nanoparticle suspensions were obtained from MATHYM SAS, Champagne Au Mont d'Or, France.

Example 1: Synthesis

Poly(ethylene glycol) 6k (1 equivalent or equiv) and triethylamine (1.5 equiv) were added to dry DCM (0.17 M) in a round-bottomed flask equipped with a magnetic stir bar. Methacryloyl chloride (freshly distilled, 1.3 equiv) was then added at 0° C. and the reaction was left to stir at 25° C. overnight in the dark. Once complete the mixture was passed through a column of basic alumina using DCM as eluent. The filtrate was concentrated under reduced pressure to approximately 5% volume. The resulting crude oily product was added to rapidly stirring diethyl ether at room temperature, which was stirred for 30 minutes. The mixture was then cooled to 0° C. and stirred for a further 30 minutes. The precipitate was collected via vacuum filtration over a frit, washed with diethyl ether, and was dried under high vacuum to yield the product, Poly(ethylene glycol) dimethacrylate 6k (PEG-DMA 6k), as a white solid. 1H NMR (d6-DMSO, 300 MHz) δ (ppm): 6.03 (t, J=1.2 Hz, 2H, vinyl), 5.69 (t, J=1.6 Hz, 2H, vinyl), 4.22-4.19 (m, 4H, CH2), 3.67-3.63 (m, 4H, CH2), 3.51 (s, backbone), 1.88 (t, J=1.1 Hz, 3H, CH3).

Example 2: Synthesis

Pluronic® 10R5 (1 equiv) was loaded in a round-bottom flask coupled with a magnetic stirring bar and dissolved in dry DCM (0.1 M). Dry triethylamine (2 equiv) was added to the solution. Methacryloyl chloride (freshly distilled, 1.75 equiv) was then added at 0° C. and the reaction was left to stir at 25° C. overnight in the dark. After completion, the reaction was quenched with water and extracted with DCM. The combined organic extracts were passed through a plug of basic alumina, which was eluted with DCM. The solvent was then removed under reduced pressure to a viscous oil. The crude oily residue was dissolved in water and was dialyzed in Spectra/Por 6 membrane tubing against water for 24 hours. The dialyzed solution was then lyophilized to dryness to yield the product 10R5-DMA as a viscous colourless oil. 1H NMR (CDCl3, 300 MHz) δ (ppm): 6.08 (dd, J=1.0, 1.8 Hz, 2H, vinyl), 5.53-5.52 (m, 2H, vinyl), 5.09-5.02 (m, 1H, CH), 3.63-3.36 (m, PEG and PPG CH backbone), 3.41 (t, J=6.5 Hz, 4H, CH2), 1.92 (m, 6H, CH3), 1.26-1.23 (m, 6H, CH3), 1.13-1.11 (m, PPG CH3 backbone).

Example 3: Synthesis

Poly(ethylene glycol) (1 equiv) was loaded into a round-bottom flask coupled with a magnetic stirring bar. Dichloromethane (DCM, 0.17 M) and triethylamine (1.6 equiv) were added and the solution was cooled down to 0° C. Methanesulfonyl chloride (1.25 equiv) was then added slowly and the reaction was left to stir at 0° C. for 45 min and was warmed to room temperature overnight. Once complete, the reaction was quenched with water and extracted with DCM. The aqueous phase was washed with DCM. The combined organic layer was dried over magnesium sulfate. The mixture was filtered, and the filtrate was concentrated under reduced pressure to approximately 5% volume. The resulting crude oily product was added to rapidly stirring diethyl ether at room temperature, which was stirred for 30 minutes. The mixture was then cooled to 0° C. and stirred for a further 30 minutes. The precipitate was collected via vacuum filtration over a frit, washed with diethyl ether, and was dried under high vacuum to yield the Poly(ethylene glycol) dimesylate (PEG DOMs) as a white solid. 1H NMR (DMSO-d6, 300 MHz) δ (ppm): 4.34-4.27 (m, 4H, MsOCH2), 3.72-3.63 (m, 4H, CH2), 3.51 (br s, backbone), 3.17 (s, 6H, CH3).

Poly(ethylene glycol) dimesylate was transferred into a round-bottom flask coupled with a magnetic stirring bar. 25% aqueous ammonia solution (approx. 5 mL/mmol or until the viscosity is reduced) was added into the flask, which was tightly sealed with a stopper and metal clamp. The reaction was vigorously stirred for approx. 3 days. Once full conversion was confirmed by H NMR, the aqueous layer was extracted ¾ times with dichloromethane and the combined organic extracts were dried over magnesium sulfate and concentrated under reduced pressure but only to a viscous oil. The remaining residue was vigorously stirred, and diethyl ether was then added until a substantial precipitate was observed. The solution was further cooled down in an ice bath to maximize the precipitate yield. The precipitate was collected via vacuum filtration over a frit, washed with diethyl ether, and was further dried under high vacuum to yield Poly(ethylene glycol) diamine 2k as a white solid. 1H NMR (DMSO-d6, 300 MHz) δ (ppm): 3.51 (br s, backbone), 3.36 (t, J=5.8 Hz, 4H, CH2), 2.66 (t, J=5.7 Hz, 4H, CH2).

Poly(ethylene glycol) diamine (1 equiv) was loaded into a round-bottom flask coupled with a magnetic stirring bar and dissolved in dichloromethane (0.18 M). Acryloyl chloride (distilled, 1.65 equiv) was added followed by sodium hydroxide solution (1 M, 1.6 equiv). The biphasic solution was vigorously stirred at 25° C. for 1.5 h (can be up to 5 h). After the reaction reached completion (evaluated by H NMR), sodium hydroxide solution (1 M, 1.6 equiv) was added and the mixture was stirred for 5 min. The mixture was transferred into a separatory funnel and the aqueous layer was extracted with DCM. The organic phase was passed through a plug of basic alumina. The plug was washed with DCM as eluent. The solvent was then removed under reduced pressure but only to a viscous oil. The remaining residue was vigorously stirred. Diethyl ether was then added until more noticeable precipitation was observed. The solution was further cooled down in an ice bath to maximize the precipitate yield. The precipitate was collected via vacuum filtration over a frit, washed with diethyl ether. The white powder was dried under high vacuum to remove the ether and was then lyophilized to obtain Poly(ethylene glycol) diacrylamide 2k. 1H NMR (CDCl3, 300 MHz) δ (ppm): 6.54 (br s, 2H, NH), 6.28 (dd, J=1.5, 17.0 Hz, 2H, vinyl), 6.14 (dd, J=10.0, 17.0 Hz, 2H, vinyl), 5.61 (d, J=10.0 Hz, 2H, vinyl), 3.63 (br s, backbone), 3.52 (dd, J=5.0, 10.1 Hz, 4H, CH2); 13C NMR (CDCl3, 75 MHz) δ (ppm): 165.7, 131.2, 126.2, 70.7, 70.4, 69.9, 39.4.

Example 4: Synthesis

Poly(ethylene glycol) (1 equiv) was loaded into a round-bottom flask coupled with a magnetic stirring bar. Dichloromethane (DCM, 0.17 M) and triethylamine (1.6 equiv) were added and the solution was cooled down to 0° C. Methanesulfonyl chloride (1.25 equiv) was then added slowly and the reaction was left to stir at 0° C. for 45 min and was warmed to room temperature overnight. Once complete, the reaction was quenched with water and extracted with DCM. The aqueous phase was washed with DCM. The combined organic layer was dried over magnesium sulfate. The mixture was filtered, and the filtrate was concentrated under reduced pressure to approximately 5% volume. The resulting crude oily product was added to rapidly stirring diethyl ether at room temperature, which was stirred for 30 minutes. The mixture was then cooled to 0° C. and stirred for a further 30 minutes. The precipitate was collected via vacuum filtration over a frit, washed with diethyl ether, and was dried under high vacuum to yield the Poly(ethylene glycol) dimesylate as a white solid. 1H NMR (DMSO-d6, 300 MHz) δ (ppm): 4.34-4.27 (m, 4H, MsOCH2), 3.72-3.63 (m, 4H, CH2), 3.51 (br s, backbone), 3.17 (s, 6H, CH3).

A round-bottom flask coupled with a magnetic stirring bar was loaded with dry THF (0.15 M) and sodium hydride (2 equiv, 60% dispersion in mineral oil) under an argon atmosphere. The solution was cooled in an ice bath and the 1,3-propanediol (2.5 equiv) was slowly added. The mixture was left to stir for at 6 hours while warming up to room temperature. Then the polyethylene glycol dimesylate (1 equiv) was slowly added to the mixture. A reflux condenser was then connected, and the reaction was heated to reflux overnight. When complete conversion was reached, the reaction mixture was cooled down to room temperature. Once cooled, water and dichloromethane were added. The aqueous phase was further extracted with dichloromethane (⅔ times). The combined organic extract was dried over magnesium sulfate and was concentrated under reduced pressure to roughly 5% volume. The remaining residue was vigorously stirred, and diethyl ether was then added until a substantial precipitate was observed. The solution was further cooled down in an ice bath to maximize the precipitate yield. The precipitate was collected via vacuum filtration over a frit, washed with diethyl ether, and was further dried under high vacuum to yield Poly(ethylene glycol) di(propan-3-ol) 2k as a white solid. 1H NMR (DMSO-d6, 300 MHz) δ (ppm): 4.34 (t, J=5.2 Hz, 2H, OH), 3.51 (br s, backbone), 1.63 (p, J=6.5 Hz, 4H, CH2).

Poly(ethylene glycol) di(propan-3-ol) (1 equiv) was loaded in a round-bottom flask coupled with a magnetic stirring bar and dissolved in dry DCM (0.17 M). Triethylamine (1.5 equiv) was added to the solution. Methacryloyl chloride (freshly distilled, 1.3 equiv) was then added at 0° C. and the reaction was left to stir at 25° C. overnight in the dark. Once complete the mixture was passed through a column of basic alumina using DCM as eluent. The filtrate was concentrated under reduced pressure to approximately 5% volume. The resulting crude oily product was added to rapidly stirring diethyl ether at room temperature, which was stirred for 30 minutes. The mixture was then cooled to 0° C. and stirred for a further 30 minutes. The precipitate was collected via vacuum filtration over a frit, washed with diethyl ether, and was dried under high vacuum to yield Poly(ethylene glycol) di(propan-3-methacrylate) 2k as a white solid. 1H NMR (CDCl3, 300 MHz) δ (ppm): 6.01 (dd, J=0.8, 1.7 Hz, 2H, vinyl), 5.47 (t, J=1.7 Hz, 2H, vinyl), 4.16 (t, J=6.4 Hz, 4H, CO2CH2), 3.57 (br s, backbone), 3.49 (t, J=6.4 Hz, 4H, CH2), 1.92-1.84 (m, 4H, CH2), 1.86 (s, 6H, CH3); 13C NMR (CDCl3, 75 MHz) δ (ppm): 167.3, 136.3, 125.2, 70.6, 70.5, 70.2, 67.7, 61.8, 28.9, 18.2.

Example 5: Synthesis

Ethyl (2,4,6-trimethylbenzoyl) phenylphosphinate (TPO-L, 1 equiv) was added to 2-butanone (0.6 M) stirred at room temperature. Anhydrous lithium iodide (1.1 equiv) was then added. After 10 min, a pale orange solution was obtained. This solution was heated in an oil bath to 60° C. and stirred at this temperature for 24 hours. The suspension was cooled to room temperature and was filtered, and the filtrate was washed with cold 2-butanone, followed by diethyl ether. The solid material was dried under vacuum. Lithium phenyl-2,4,6-trimethylbenzoylphosphinate (LAP) was obtained as a white solid.

The LAP product (1 equiv) was dissolved in distilled water (0.5 M) and was vigorously stirred at room temperature. Dilute aqueous sulfuric acid was then added until a precipitate had formed. To the resulting suspension, ethyl acetate was added and after vigorous mixing, the phases were separated. The aqueous layer was additionally extracted with ethyl acetate. The combined organic layers were washed with distilled water and dried over anhydrous sodium sulfate. After evaporation of the solvent under reduced pressure, a pale yellow solid was obtained. The yellow compound was dissolved in dichloromethane (0.4 M). Oxalyl chloride (2 equiv) was then added in small portions at room temperature. After 20 hours, the mixture was evaporated under reduced pressure. Dry toluene was added to the residual oil and was evaporated again to dryness to give a yellow oil which was used in next step without further purification.

Dichloromethane (0.1 M) was added to the yellow oil (1.75 equiv) followed by poly(ethylene glycol) methyl ether (950 g/mol; 1 equiv) and triethylamine (2 equiv). The reaction mixture was stirred at room temperature overnight. The solution was then concentrated under vacuum to obtain a yellow oil which was vigorously stirred, and diethyl ether was added until a substantial precipitate was observed. The flask was additionally cooled to maximize the precipitate yield. The precipitate was collected via vacuum filtration, washed with diethyl ether, and dried under high vacuum to yield Poly(ethylene glycol) methyl ether (2,4,6-trimethylbenzoyl) phenylphosphinate (LAP-PEG) as a white solid. 1H NMR (300 MHz, Deuterium Oxide) δ 7.88-7.74 (m, 3H), 7.62 (td, J=7.6, 3.9 Hz, 2H), 6.95 (s, 2H), 4.30-4.23 (m, 2H), 3.71 (s, PEG backbone), 3.57 (s, 5H), 3.40 (s, 3H), 2.27 (s, 3H), 2.08 (s, 6H); 31P NMR (121 MHz, Deuterium Oxide) δ 19.5; 13C NMR (75 MHz, Deuterium Oxide) δ 216.9, 215.4, 141.4, 135.7, 135.1, 134.7, 134.7, 134.4, 132.8, 132.6, 129.5, 129.3, 128.7, 123.6, 71.0, 69.6, 66.2, 66.1, 58.1, 30.2, 20.4.

Example 6: Measurement Method

The photopolymerization yield was examined by gravimetric determination of the cured polymer mass: Solutions containing PEG DMA 6k prepared according to Example 1 (15% w/w), Poly(ethylene glycol) methyl ether (2,4,6-trimethylbenzoyl) phenylphosphinate (0.1% w/w) and different radiopacifiers (30% m/m) were prepared in deionized water. 1000 mg of the premixed solutions were loaded into a 2 mL polystyrene cuvette. The cuvettes were placed in a blue light source (Atlas Photonics Sarl, LUMOS 43) and irradiated for 2 minutes at a wavelength of λ=405 nm and a power density of 200 mW cm$^{-2}$. The solid hydrogels were removed, wiped to remove residual liquid, and weighed. The ratio of solid, cured material to liquid, uncured material was calculated and used as a measure for the photopolymerization yield.

Example 7: Measurement Method

The photopolymerization depth was examined by irradiating a sample of the material in a white plastic tube. Solutions containing PEG DMA 6k prepared according to Example 1 (30% w/w), Poly(ethylene glycol) methyl ether (2,4,6-trimethylbenzoyl) phenylphosphinate (0.1% w/w)

and different radiopacifiers (40% m/m) were prepared in deionized water. The premixed solutions were injected into a white plastic tube (Ø=500 μm, length=4 cm) and were irradiated for 20 s with a dental curing lamp (Dentlight Inc, FUSION 5) from above. Once cured, solid hydrogels' lengths were measured and used as a measure for the photopolymerization depth. To examine curved structures, a mould was used that is described as follows:

A cylindrical opening at the top with a diameter of 2 mm and a depth of 4 mm. The bottom of the cylindrical cavity had a conical opening with a diameter of 1 mm and a taper with a decreasing opening of minus 6% of diameter per millimeter of depth. After 8 mm, there was a 130° bend that ends with a 0.28 mm diameter. In total the mould had a vertical depth of 16 mm.

Example 8: Sample Preparation

Hydrogel samples were prepared by pipetting a composition of prepolymer prepared according to Examples 1-4 (30% w/w), different radiopacifiers (between 30-40% w/w), Poly(ethylene glycol) methyl ether (2,4,6-trimethylbenzoyl) phenylphosphinate (0.25% w/w), and deionized water into a cylindrical sample mould (V=~250 μL, Ø=8 mm, height=5 mm) and photopolymerizing it using a blue light source of 400-460 nm wavelength. If the radiopacifier was added as a suspension in water, the amount of water was reduced accordingly.

Example 9: Comparative 2 mm thick hydrogel samples containing PEG DMA 6k prepared according to Example 1 and nano-YbF$_3$ (40% w/w, d$_{mean, TEM}$=20 nm) were prepared according to Example 8. Subsequently, samples were immersed in 5 mL of water or phosphate-buffered saline on a shaking plate. After 3, 8 and 24 days, the samples were retrieved. The radiopacity of the samples was determined in accordance with ISO 13116-2014. The radiopacity per mm of sample of the immersed samples was compared to that of a fresh, non-immersed sample and was found not to differ significantly over the immersion period:

| Immersion | 0 days | 3 days | 8 days | 24 days |
|---|---|---|---|---|
| H$_2$O | 3.5 ± 0.1 mmAl | 3.3 ± 0.1 mmAl | 3.4 ± 0.1 mmAl | 3.5 ± 0.1 mmAl |
| PBS | 3.6 ± 0.1 mmAl | 3.5 ± 0.1 mmAl | 3.4 ± 0.1 mmAl | 3.4 ± 0.1 mmAl |

Example 10: Comparative

Compositions containing different radiopacifiers were prepared according to Example 7 and compared in terms of their homogeneity after storage for 30 days at 37° C., injectability by their ability to be passed through a 30 G cannula using a PacDent Luer-Lock Endo Irrigation Syringe (1.2 mL; black), flowability (in accordance with ISO 6876-2012), and total attenuation through a 1 cm cuvette at 405 nm. Testing was carried out sequentially and when one sample did not meet the required criteria, it was not subjected to the subsequent tests. "—" indicates that the radiopacifier was not tested.

| Radiopacifier | Injectability | Homogeneity | Flowability | Total attenuation |
|---|---|---|---|---|
| None (control) | Yes | Homogenous | >40 mm | 0.166 |
| CaWO$_4$ | Yes | Segregation | — | >3.000 |
| BaSO$_4$ | No | Homogenous | — | — |
| ZrO$_2$ powder | Yes | Segregation | — | >3.000 |
| YbF$_3$ powder | Yes | Segregation | — | — |
| Bi$_2$O$_3$ powder | No | Segregation | — | >3.000 |
| (BiO)$_2$CO$_3$ powder | No | Segregation | — | >3.000 |
| Bismuth subsalicylate | No | Segregation | — | — |
| Glass powder (GA018-161 UF0.7) | Yes | Segregation | — | >3.000 |
| Glass powder (8235 K5) | No | Segregation | — | >3.000 |
| Nano-YSZ (8% Y, d$_{mean, TEM}$ = 5 nm) | Yes | Homogenous | >40 mm | 0.337 |
| NanO-YbF$_3$ (d$_{mean, TEM}$ = 20 nm) | Yes | Homogenous | >40 mm | 1.427 |

Example 11: Comparative

The photopolymerization yield of compositions containing different radiopacifiers was compared according to Example 6.

| Radiopacifier | Polymerization yield |
|---|---|
| None (control) | 94.5% |
| CaWO$_4$ | 98.3% |
| BaSO$_4$ | 0% |
| ZrO$_2$ powder | 68.2% |
| YbF$_3$ powder | 24% |
| Bi$_2$O$_3$ powder | 11.1% |
| (BiO)$_2$CO$_3$ powder | 55.9% |
| Bismuth subsalicylate | To viscous to test |
| Glass powder (Schott GA018-161 UF0.7) | 97.2% |
| Glass powder (Schott 8235 K5) | 97.9% |
| Nano-YSZ (8% Y, d$_{mean, TEM}$ = 5 nm) | 98.5% |
| Nano-YbF$_3$ (d$_{mean, TEM}$ = 20 nm) | 98.3% |

Example 12: Comparative

The photopolymerization depth in straight and curved structures of compositions containing different radiopacifiers was compared according to Examples 7 and 8.

| Radiopacifier | Photopolymerization depth in straight structure | Photopolymerization depth in curved structure |
|---|---|---|
| None (control) | 17.1 mm | 15.2 mm |
| $CaWO_4$ | 3.0 mm | 3.0 mm |
| $ZrO_2$ powder | 1.1 mm | 1.0 mm |
| $(BiO)_2CO_3$ powder | Clogged syringe | Clogged syringe |
| Bismuth subsalicylate | Too viscous | Too viscous |
| Glass powder (GA018-161 UF0.7) | 1.7 mm | 2.0 mm |
| Glass powder (Schott 8235 K5) | Clogged syringe | Clogged syringe |
| Nano-YSZ (8% Y, $d_{mean, TEM}$ = 5 nm) | 16.1 mm | 15.8 mm |
| Nano-$YbF_3$ ($d_{mean, TEM}$ = 20 nm) | 10.9 mm | 12.6 mm |

Example 13: Comparative

Hydrogel samples containing PEG DMA 6k prepared according to Example 1 and different amounts of nano-$YbF_3$ ($d_{mean, TEM}$=20 nm) were prepared according to Example 8. The radiopacity per mm of sample was determined in accordance with ISO 13116-2014.

| Nano-$YbF_3$ | 16.8% | 22.6% | 27.1% | 32.5% | 37.3% | 42.8% | 47.9% |
|---|---|---|---|---|---|---|---|
| Radiopacity [mmAl] | 1.4 | 1.9 | 2.3 | 2.6 | 3.2 | 3.8 | 4.2 |
| Nano-YSZ | 33.0% | 36.0% | 39.0% | 41.0% | 42.2% | 44.0% | 44.8% |
| Radiopacity [mmAl] | 2.8 | 3.0 | 3.2 | 3.4 | 3.5 | 3.6 | 3.7 |

Example 14: Comparative

Compositions containing PEG DMA 6k prepared according to Example 1 and different radiopacifiers were prepared according to Example 8. The total attenuation through a 1 cm cuvette at 405 nm before and after storage for 30 days at 37° C. was measured.

| Radiopacifier | Total attenuation Before storage | Total attenuation After storage |
|---|---|---|
| Nano-YSZ (8% Y, $d_{mean, TEM}$ = 5 nm) | 0.337 | 0.338 |
| Nano-$YbF_3$ ($d_{mean, TEM}$ = 20 nm) | 1.427 | 1.422 |

REFERENCES

[1] Y. Aoyagi, H. Takahashi, N. Iwasaki, E. Honda, T. Kurabayashi, *Dental Materials Journal* 2005, 24, 315-320.
[2] F. M. Collares, F. A. Ogliari, G. S. Lima, V. R. C. Fontanella, E. Piva, S. M. W. Samuel, *International Endodontic Journal* 2010, 43, 792-797.
[3] H. Kamohara, T. Takeshita, *Root Canal Filling Material*, n.d., US2002051952 (A1).
[4] W. Jia, B. Alpert, *Root Canal Filling Material*, n.d., US2003113686 (A1).
[5] J. E. Klee, *Dental Filling Composition and Method*, n.d., U.S. Pat. No. 5,624,976 (A).

The invention claimed is:

1. A highly flowable, crosslinkable medical or dental composition, said highly flowable composition comprising a crosslinkable compound, a polymerization initiator and a heterogeneous, solid radiopacifier wherein;
   i. it has a radiopacity of at least 3 mmAl/mm according to ISO 13116-2014,
   ii. it remains a stable dispersion for 30 days at about 37° C., stability referring to less than 1% of the heterogenous solid precipitating,
   iii. it has a flowability >40 mm according to ISO 6876-2012 measured at room temperature (22° C.), and
   iv. the heterogeneous radiopacifier has an average particle size between 1 and 500 nm measured by transmission electron microscopy according to ISO 21363-2020, and
   wherein the composition further comprises water as a solvent, and
   wherein the composition contains 5-70% in weight of the crosslinkable material, 5-60% in weight of the heterogeneous radiopacifier, 5-60% in weight of the suitable solvent, and 0.001-10% in weight of the polymerization initiator.

2. The highly flowable composition of claim 1, wherein it photopolymerizes to a depth of cure of at least 1 mm upon irradiating the sample within a white plastic tube (Ø=500 µm, length=4 cm) for 20 s with a standard dental curing lamp (Dentlight Inc FUSION 5, peak wavelength 440-480 nm, power density 4000 mW/cm2) from above.

3. The highly flowable composition of claim 1, wherein it photopolymerizes to a depth of cure of at least 10 mm.

4. The highly flowable composition of claim 1, wherein said heterogeneous radiopacifier is in the form of a powder or suspension and is selected from the group consisting of non-water-soluble metals, metal oxides, metal salts, or metal complexes.

5. The highly flowable composition of claim 4, wherein said heterogeneous radiopacifier is selected from the group consisting of metal salts such as barium sulfate, ytterbium halides, bismuth halides, calcium tungstate or metal oxides such as ytterbium oxide, zirconium oxide, tantalum oxide, cerium dioxide, yttrium oxide, gadolinium oxide, aluminum oxide; heavy-metal containing silicate glasses; and combinations thereof.

6. The highly flowable composition according to claim 1, wherein it further comprises a suitable solvent, wherein said suitable solvent consists of water, acetone, DMSO or alcohols or mixtures thereof.

7. The highly flowable composition according to claim 1, wherein it contains about 36-90% in weight of said heterogeneous radiopacifier.

8. The highly flowable composition according claim 1, wherein the polymerization initiator is a UV or visible light photoinitiator.

9. The highly flowable composition of claim 8, wherein said UV or visible light photoinitiator is selected from the group comprising quinones, α-hydroxy ketones, acylgermanium derivatives, bis(acyl)phosphine oxide derivatives, mono(acyl)phosphine oxide derivatives or mixtures thereof.

10. The highly flowable composition according to claim 1, wherein the crosslinkable compound is water-soluble.

11. The highly flowable composition of claim 10, wherein said water-soluble crosslinkable compound consists of a polymer functionalised with polymerizable endgroups.

12. A crosslinked polymer composition obtainable by crosslinking the highly flowable, crosslinkable medical or dental composition according to claim 1, wherein its radiopacity of at least 3 mmAl/mm remains unchanged when it is immersed in aqueous media for at least 24 days.

13. The use of the highly flowable, crosslinkable medical or dental composition according to claim 1, to fill cavities or hollow structures within teeth, dental root canals or dental fissures, blood vessel, lymphatic vessels, bronchi and bronchioles, or bone cavities in human or animal subjects.

14. The use of the highly flowable, crosslinkable medical or dental composition according to claim 13, wherein said composition is capable of being injected through small 31G cannulas with an inner diameter of 0.13 mm and an outer diameter of 0.26 mm, and wherein said highly flowable composition allows photopolymerization of high depth of cure of at least 1 mm in curved tubular structures.

* * * * *